US009605970B1

(12) United States Patent
Day et al.

(10) Patent No.: US 9,605,970 B1
(45) Date of Patent: Mar. 28, 2017

(54) METHODS AND SYSTEMS FOR DRIVER ASSISTANCE

(71) Applicant: Harman International Industries, Incorporated, Stamford, CT (US)

(72) Inventors: William P. Day, Brighton, MI (US); Daniel DeClerck, Milford, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 14/845,061

(22) Filed: Sep. 3, 2015

(51) Int. Cl.
| | |
|---|---|
| *G06Q 40/08* | (2012.01) |
| *G08G 1/16* | (2006.01) |
| *G01C 21/36* | (2006.01) |
| *B60G 17/015* | (2006.01) |
| *B60W 30/14* | (2006.01) |

(52) U.S. Cl.
CPC ....... *G01C 21/3605* (2013.01); *B60G 17/015* (2013.01); *B60W 30/14* (2013.01)

(58) Field of Classification Search
CPC ............ G01C 21/3605; G01C 21/3697; G08G 1/0112; G08G 1/16; B60W 40/06; G06Q 40/08; G06Q 10/047; B62D 15/025
USPC .................................... 701/1, 37, 408; 705/4
See application file for complete search history.

(56) References Cited

U.S. PATENT DOCUMENTS

| | | | | |
|---|---|---|---|---|
| 6,209,026 B1* | 3/2001 | Ran | ...................... | G06Q 10/047 702/3 |
| 2001/0037173 A1* | 11/2001 | Sekine | ............... | G01C 21/3697 701/410 |
| 2005/0065711 A1 | 3/2005 | Dahlgren et al. | | |
| 2005/0187714 A1 | 8/2005 | Brulle-Drews | | |
| 2009/0048738 A1* | 2/2009 | Iwazaki | ............... | B62D 15/025 701/44 |
| 2011/0137551 A1 | 6/2011 | Peri | | |
| 2011/0301802 A1* | 12/2011 | Rupp | ................... | G08G 1/0112 701/408 |
| 2015/0094948 A1 | 4/2015 | Lu et al. | | |
| 2015/0166072 A1* | 6/2015 | Powers | ................. | B60W 40/06 701/1 |
| 2016/0055750 A1* | 2/2016 | Linder | ..................... | G08G 1/16 340/905 |

(Continued)

FOREIGN PATENT DOCUMENTS

JP      H10307042 A      11/1998

OTHER PUBLICATIONS

European Patent Office, Extended European Search Report Issued in Application No. 16182392.7, Jan. 4, 2017, Germany, 12 pages.

*Primary Examiner* — Yuri Kan
(74) *Attorney, Agent, or Firm* — McCoy Russell LLP

(57) ABSTRACT

Embodiments are disclosed for driver assistance. An example driver assistance system for a vehicle includes a sensor module communicatively coupled to one or more sensors, a user interface to receive input from a user, a processor, and a storage device storing instructions executable by the processor to determine a route for the vehicle to travel. The instructions are further executable to select route segments of the route if the route segment quality of the route segments are greater than a threshold, one or more of the threshold and the route segment quality being based on inputs indicating an observed condition of the route segment, the inputs being received form one or more of the user and a remote user outside of the vehicle.

20 Claims, 6 Drawing Sheets

(56) References Cited

U.S. PATENT DOCUMENTS

2016/0086285 A1\* 3/2016 Jordan Peters ........ G06Q 40/08
705/4

\* cited by examiner

METHODS AND SYSTEMS FOR DRIVER ASSISTANCE

FIELD

The disclosure relates to assisting a driver of a vehicle to select routes based on the quality of the routes.

BACKGROUND

The driving experience of a driver may rely heavily on the quality of the roads or road segments that are travelled. Most vehicles perform well on relatively smoother roadways, thus enabling a more comfortable experience for the driver. Bumpy roads not only lead to an uncomfortable experience, but in some cases exacerbate underlying health conditions. For motorists, in addition to contributing to the experience, the quality of roads may also be a safety issue. Any irregularities, such as pot-holes, speed bumps, uneven pavement, and/or other disruptions on the road could lead a crash due to loss of traction, and any airborne debris on the road could cause physical injuries to the driver.

SUMMARY

Embodiments are disclosed for assisting drivers by automatically selecting routes/route segments based on quality of the routes/route segments in the routes. An example driver assistance system for a vehicle includes a sensor module communicatively coupled to one or more sensors, a user interface to receive input from a user, a processor, and a storage device storing instructions executable by the processor to determine a route for the vehicle to travel, the route including one or more route segments, and for each of the one or more route segments in the route, select that route segment from a plurality of candidate route segments if a route segment quality of that route segment is greater than a threshold, one or more of the route segment quality and the threshold being based on inputs indicating an observed condition of the route segment, the inputs being received from one or more of the user and a remote user outside of the vehicle.

An example method for a navigation system of a vehicle includes receiving a request to determine a route of travel for the vehicle, the request including one or more of a destination and a direction of travel, determining the route for the vehicle to travel, the route including one or more route segments, and selecting the route from a plurality of candidate routes if a route score of that route is greater than a threshold, the route score being based on a quality of the one or more route segments of the route as reported by one or more of an occupant of the vehicle and a remote user outside of the vehicle, and one or more of the route score and the threshold being further based on additional input from one or more of the occupant and a sensor of the vehicle.

An example navigation system of a vehicle includes a route segment score memory, a sensor module communicatively coupled to plurality of sensors, a user input interface configured to receive a user input, a processor, and a storage device storing instructions executable by the processor to generate a route segment score of a route segment based on the user input and input from the sensor module, the user input including an indication of an observed condition of the route segment as entered by an occupant of the vehicle or a remote user outside of the vehicle, store the route segment score in one or more of the route segment score memory and a cloud server, and determine a route for the vehicle based on the route segment score of the route segment, the route including the route segment if the route segment score is above a threshold, and the route segment score being selectively retrieved from the route segment score memory or the cloud server.

BRIEF DESCRIPTION OF THE DRAWINGS

The disclosure may be better understood from reading the following description of non-limiting embodiments, with reference to the attached drawings, wherein below.

DETAILED DESCRIPTION

As described above, both driver experience and driver safety rely heavily on the quality of the portions of the roads upon which the driver's vehicle travels. With the proliferation of sensors in today's vehicles, it may be possible to estimate a road quality for such portions of the road based on the output of the sensors. As a quality of a road may vary along a length of the road, and a vehicle may only travel on a portion of a road to arrive at a destination, the quality of the road as a whole may not be as relevant to a driver as a quality of the portions of the road that the vehicle may travel upon to reach a destination. Accordingly, as used herein, portions of roads that may be travelled upon are referred to as route segments. For example, a vehicle may travel from a starting point to a destination along a route, the route being formed from one or more route segments. Each route segment may include a portion of a road (e.g., a mile-long stretch of an interstate) that may be travelled (e.g., in order to reach a destination). However, it is to be understood that a route segment may include a complete road (e.g., from beginning to end of the road) and/or portions of multiple roads in some examples. The disclosure provides more detailed examples of segmenting roads/routes into route segments below.

Figure 1:
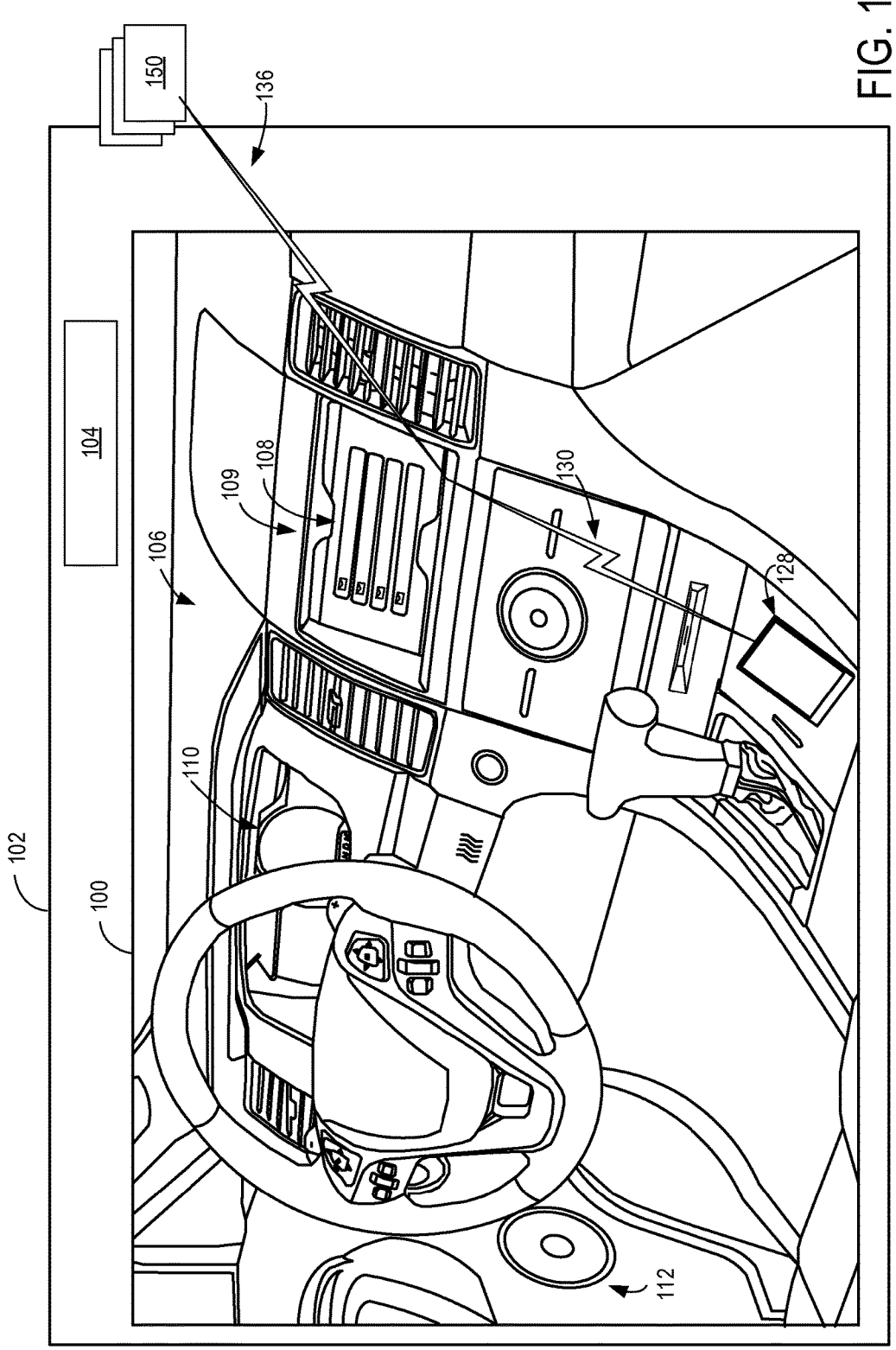
FIG. 1 shows an example partial view of a vehicle cabin in accordance with one or more embodiments of the present disclosure.

In order to determine the quality of a route and/or route segment, the present disclosure describes a navigation system that communicates with sensors and generates a route and/or route segment quality measure based on the output of the sensors that may be further adjusted based on the driver's input. The driver may be advised of the route/route segment based on the estimated route/route segment quality thereby detecting and tracking route/route segment hazards. FIG. 1 shows an example partial view of one type of environment for a communication system for data synchronization: an interior of a cabin 100 of a vehicle 102, in which a driver and/or one or more passengers may be seated. Vehicle 102 of FIG. 1 may be a motor vehicle including drive wheels (not shown) and an engine 104. Engine 104 may be an internal combustion engine including one or more combustion chambers which may receive intake air via an intake passage and exhaust combustion gases via an exhaust passage in some examples. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle. Vehicle 102 may be a motorcycle, a marine vehicle, a locomotive, or any other vehicle in some examples. For example, where vehicle 102 is a marine vehicle, the routes/route segments described herein may refer to waterways that may be travelled by the marine vehicle. As waterway conditions may be more volatile than roadway conditions, the route/route segment scoring described herein may additionally factor in reported conditions from other travelers about a given waterway (e.g., as determined by analyzing profile/status updates made by users to a social networking service) to provide more real-time information regarding the condition of the waterway. However, it is to be understood that such crowd-sourcing of condition information may also be used in determining a route/route segment score for roadways.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user and/or a driving experience of a user (e.g., where pressure changes may correspond to irregularities in the route segment), microphones to receive user input in the form of voice commands, to measure road noise that may be indicative of a quality of the route segment, to enable a user to conduct telephone calls, and/or to measure ambient noise in the cabin 100, cameras mounted on the vehicle, accelerometer and/or gyroscopes coupled to the vehicle capable of measuring acceleration of the vehicle, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle (e.g., based on signals received at a mobile device and/or at an in-vehicle computing system indicating vehicle diagnostics), ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 150 and/or mobile device 128.

Cabin 100 may also include one or more user objects, such as mobile device 128, that are stored in the vehicle before, during, and/or after travelling. The mobile device 128 may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct Near-Field Communication [NFC], cellular connectivity, etc.) and configured to provide two-way communication between the mobile device and the in-vehicle computing system. The mobile device 128 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smartwatch, GPS system, camera, accelerometer, gyroscope, inclinometer etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

Figure 2:
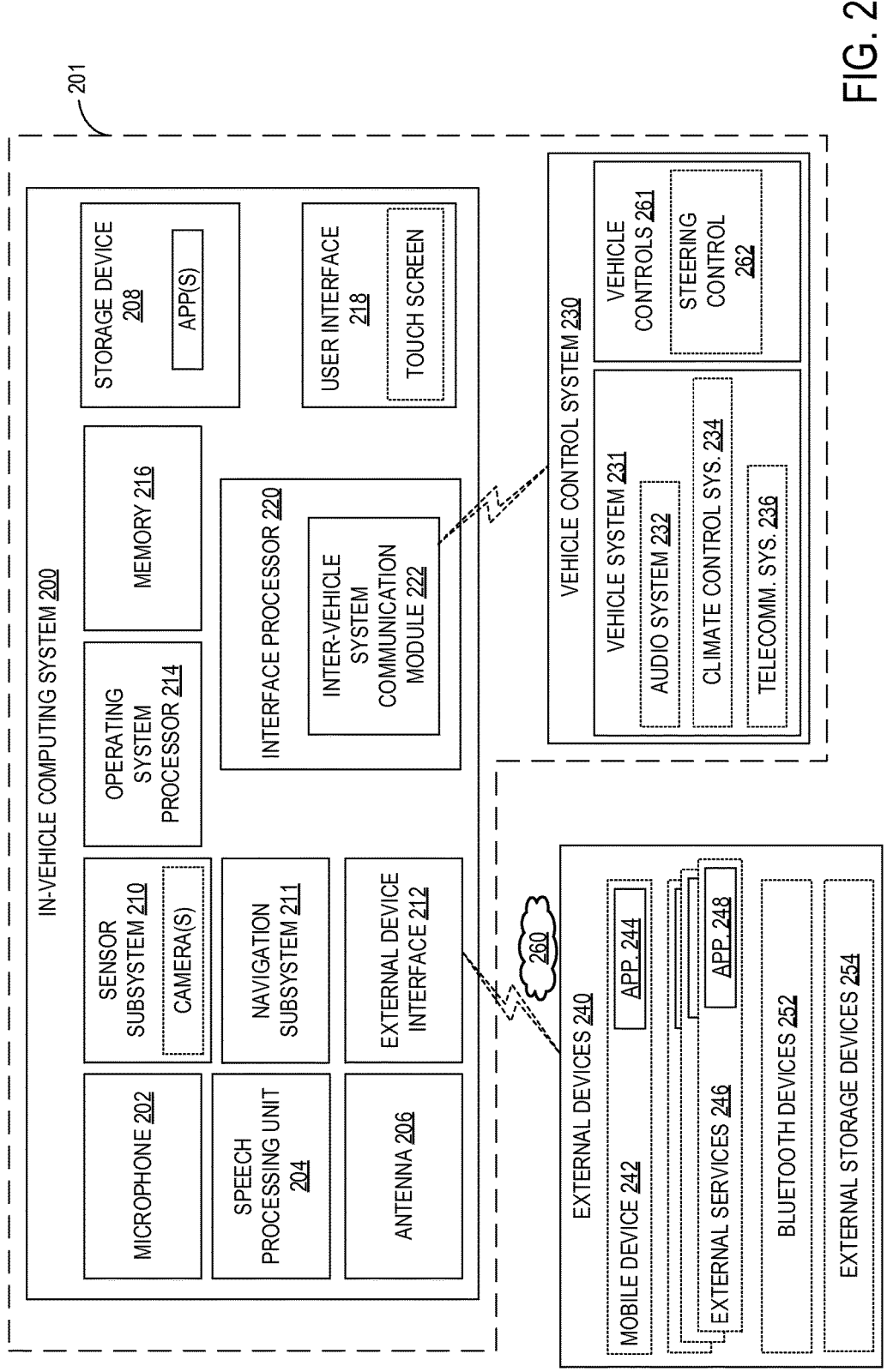
FIG. 2 shows an example in-vehicle computing system in accordance with one or more embodiments of the present disclosure.

FIG. 2 shows a block diagram of an in-vehicle computing system 200 configured and/or integrated inside vehicle 201. In-vehicle computing system 200 may be an example of in-vehicle computing system 109 of FIG. 1 and/or may perform one or more of the methods described herein in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 201 in order to enhance an in-vehicle experience for a driver and/or a passenger.

In-vehicle computing system 200 may include one or more processors including an operating system processor 214 and an interface processor 220. Operating system processor 214 may execute an operating system on the in-vehicle computing system, and control input/output, display, playback, and other operations of the in-vehicle computing system. Interface processor 220 may interface with a vehicle control system 230 via an inter-vehicle system communication module 222.

Inter-vehicle system communication module 222 may output data to other vehicle systems 231 and vehicle control elements 261, while also receiving data input from other vehicle components and systems 231, 261, e.g. by way of vehicle control system 230. When outputting data, inter-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 208 may be included in in-vehicle computing system 200 to store data such as instructions executable by processors 214 and 220 in non-volatile form. The storage device 208 may store application data to enable the in-vehicle computing system 200 to run an application for connecting to a cloud-based server and/or collecting information for transmission to the cloud-based server. The application may retrieve information gathered by vehicle systems/sensors, input devices (e.g., user interface 218), devices in communication with the in-vehicle computing system (e.g., a mobile device connected via a Bluetooth link), etc. In-vehicle computing system 200 may further include a volatile memory 216. Volatile memory 216 may be random access memory (RAM). Non-transitory storage devices, such as non-volatile storage device 208 and/or volatile memory 216, may store instructions and/or code that, when executed by a processor (e.g., operating system processor 214 and/or interface processor 220), controls the in-vehicle computing system 200 to perform one or more of the actions described in the disclosure.

A microphone 202 may be included in the in-vehicle computing system 200 to receive voice commands from a user, to measure ambient noise in the vehicle, to determine whether audio from speakers of the vehicle is tuned in accordance with an acoustic environment of the vehicle, etc. A speech processing unit 204 may process voice commands, such as the voice commands received from the microphone 202. In some embodiments, in-vehicle computing system 200 may also be able to receive voice commands and sample ambient vehicle noise using a microphone included in an audio system 232 of the vehicle.

One or more additional sensors may be included in a sensor subsystem 210 of the in-vehicle computing system 200. For example, the sensor subsystem 210 may include a camera, such as a rear view camera for assisting a user in parking the vehicle, a cabin camera for identifying a user (e.g., using facial recognition and/or user gestures), and/or a front view camera to assess quality of the route segment ahead. Sensor subsystem 210 of in-vehicle computing system 200 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, vehicle motion, vehicle inclination, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230. A navigation subsystem 211 of in-vehicle computing system 200 may generate and/or receive navigation information such as location information (e.g., via a GPS sensor and/or other sensors from sensor subsystem 210), route guidance, traffic information, point-of-interest (POI) identification, and/or provide other navigational services for the driver. The navigation subsystem 211 may include an inertial navigation system that may further determine a position, orientation, and velocity of the vehicle via motion and rotation sensor inputs. Examples of motion sensors include accelerometers, and examples of rotation sensors include gyroscopes. The navigation subsystem 211 may communicate with motion and rotation sensors included in the sensor subsystem 210. Alternatively, the navigation subsystem 211 may include motion and rotation sensors and determine the movement and rotation based on the output of these sensors.

External device interface 212 of in-vehicle computing system 200 may be coupleable to and/or communicate with one or more external devices 240 located external to vehicle 201. While the external devices are illustrated as being located external to vehicle 201, it is to be understood that they may be temporarily housed in vehicle 201, such as when the user is operating the external devices while operating vehicle 201. In other words, the external devices 240 are not integral to vehicle 201. The external devices 240 may include a mobile device 242 (e.g., connected via a Bluetooth, NFC, WIFI direct, or other wireless connection) or an alternate Bluetooth-enabled device 252. Mobile device 242 may be a mobile phone, smart phone, wearable devices/sensors that may communicate with the in-vehicle computing system via wired and/or wireless communication, or other portable electronic device(s). Other external devices include external services 246. For example, the external devices may include extra-vehicular devices that are separate from and located externally to the vehicle. Still other external devices include external storage devices 254, such as solid-state drives, pen drives, USB drives, etc. External devices 240 may communicate with in-vehicle computing system 200 either wirelessly or via connectors without departing from the scope of this disclosure. For example, external devices 240 may communicate with in-vehicle computing system 200 through the external device interface 212 over network 260, a universal serial bus (USB) connection, a direct wired connection, a direct wireless connection, and/or other communication link.

The external device interface 212 may provide a communication interface to enable the in-vehicle computing system to communicate with mobile devices associated with contacts of the driver. For example, the external device interface 212 may enable phone calls to be established and/or text messages (e.g., SMS, MMS, etc.) to be sent (e.g., via a cellular communications network) to a mobile device associated with a contact of the driver. The external device interface 212 may additionally or alternatively provide a wireless communication interface to enable the in-vehicle computing system to synchronize data with one or more devices in the vehicle (e.g., the driver's mobile device) via WIFI direct, as described in more detail below.

One or more applications 244 may be operable on mobile device 242. As an example, mobile device application 244 may be operated to aggregate user data regarding interactions of the user with the mobile device. For example, mobile device application 244 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 244 to external device interface 212 over network 260. In addition, specific user data requests may be received at mobile device 242 from in-vehicle computing system 200 via the external device interface 212. The specific data requests may include requests for determining where the user is geographically located, an ambient noise level and/or music genre at the user's location, an ambient weather condition (temperature, humidity, etc.) at the user's location, etc. Mobile device application 244 may send control instructions to components (e.g., microphone, etc.) or other applications (e.g., navigational applications) of mobile device 242 to enable the requested data to be collected on the mobile device. Mobile device application 244 may then relay the collected information back to in-vehicle computing system 200.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 230 may include controls for controlling aspects of various vehicle systems 231 involved in different in-vehicle functions. These may include, for example, controlling aspects of vehicle audio system 232 for providing audio entertainment to the vehicle occupants, aspects of climate control system 234 for meeting the cabin cooling or heating needs of the vehicle occupants, as well as aspects of telecommunication system 236 for enabling vehicle occupants to establish telecommunication linkage with others.

Audio system 232 may include one or more acoustic reproduction devices including electromagnetic transducers such as speakers. Vehicle audio system 232 may be passive or active such as by including a power amplifier. In some examples, in-vehicle computing system 200 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 234 may be configured to provide a comfortable environment within the cabin or passenger compartment of vehicle 201. Climate control system 234 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 230 may also include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. Vehicle controls 261 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers of the vehicle's audio system 232. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 234. For example, the control signals may increase delivery of cooled air to a specific section of the cabin.

Control elements positioned on an outside of a vehicle (e.g., controls for a security system) may also be connected to computing system 200, such as via communication module 222. The control elements of the vehicle control system may be physically and permanently positioned on and/or in the vehicle for receiving user input. In addition to receiving control instructions from in-vehicle computing system 200, vehicle control system 230 may also receive input from one or more external devices 240 operated by the user, such as from mobile device 242. This allows aspects of vehicle systems 231 and vehicle controls 261 to be controlled based on user input received from the external devices 240.

In-vehicle computing system 200 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via RF such as via antenna (s) 206 or via infrared or other means through appropriate receiving devices. In some embodiments, antenna 206 may be included as part of audio system 232 or telecommunication system 236. Additionally, antenna 206 may provide AM/FM radio signals to external devices 240 (such as to mobile device 242) via external device interface 212.

One or more elements of the in-vehicle computing system 200 may be controlled by a user via user interface 218. User interface 218 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, route/route segment quality preference, route/route segment avoidance preference, and the like. A user may also interact with one or more applications of the in-vehicle computing system 200 and mobile device 242 via user interface 218. In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface. User preferences/information and/or responses to presented messages may be performed via user input to the user interface.

Figure 3:
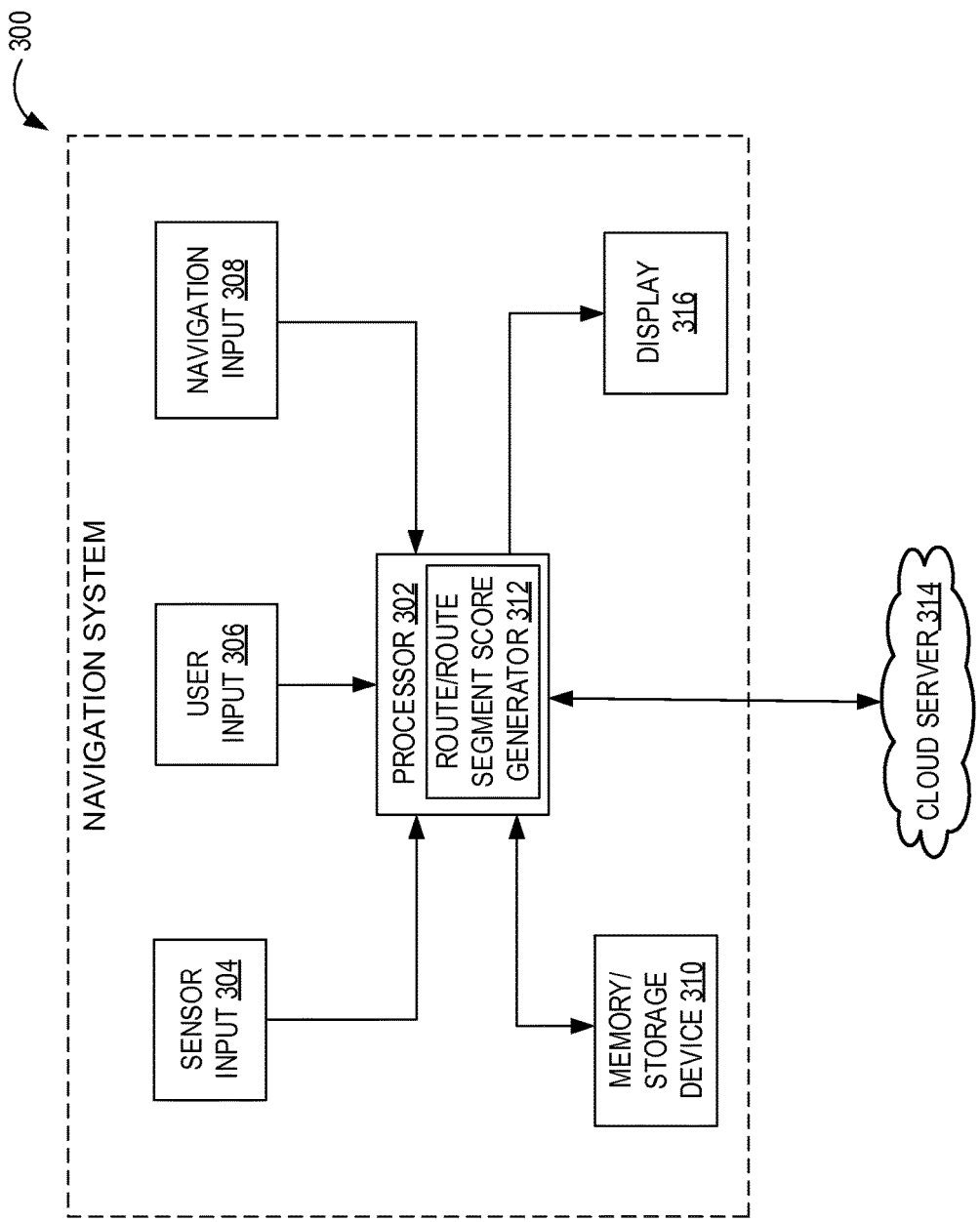
FIG. 3 shows a block diagram illustration of a navigation system generating route segment scores based on quality of the route segments in accordance with one or more embodiments of the present disclosure.

FIG. 3 is a block diagram illustration of an example navigation system 300 that determines a route/route segment quality/score based on inputs from various sensors, while taking into consideration user preferences/avoidances. The system includes a processor 302 that receives sensor input 304, user input 306, and navigation input 308. The navigation system 300 further includes a memory/storage device 310 and display 316. The navigation system may be configured as a handheld device, as a component of a motor vehicle navigation system (e.g., in-vehicle computing system, 109 of FIG. 1/in-vehicle computing system 200 of FIG. 2), as a component of a smart phone, and/or as any other suitable computing device(s). The processor 302 may be an example of the operating system processor 214 of FIG. 2, and may further include the interface processor 220 of FIG. 2, and/or may perform one or more of the methods described herein in some embodiments. The processor 302 may include a route/route segment score/quality generator 312 configured to generate a route/route segment score or route/route segment quality measure based on various inputs received as described below. The route/route segment quality generator 312 may be an algorithm that generates the route/route segment score based on the inputs received. Additionally or alternatively, the route/route segment quality generator may adaptively learn a route/route segment score based on a recent travel experience (e.g., as monitored via one or more sensors, user input, etc.). In some examples, the route/route segment quality generator may look up the route/route segment score from a look-up table that is updated with scores based on the inputs received as described below.

The sensor input 304 may be an example of an input received from the sensor subsystem 210 of FIG. 2. An example of a sensor included in the sensor subsystem 210 is a camera, such as a rear view camera and a front view camera mounted on the vehicle to capture images of the route segment which in turn can be used to determine the quality of the route/route segment. For example, when the images captured from the camera show route segments with several potholes, or uneven texture or debris, these images may be then used to generate a route/route segment score. Route/route segments with greater than a threshold number of potholes may be given a low score, for example. In other examples, route/route segments with deep potholes or open man/drain holes or stagnant water may also generate a low route/route segment score. As further examples, route/route segments with greater than threshold debris lying around, and route/route segments which are not paved or route/route segments that are covered with gravel, may also generate a low route/route segment score. As described earlier, route/route segments with debris may pose a safety issue especially for motorcycles. The processor 302 may receive the sensor input, and further adjust the route/route segment score based on the vehicle. For example, the route/route segment score/quality generator 312 may generate a route/route segment score of 2 in one scenario (on a scale of 1-10 where route/route segment score of 1 is unfit for travel, and route/route segment score of 10 is best for travel, for example), for a route/route segment with gravel. The route/route segment score may be displayed on a display 316. As such, a lower route/route segment score may indicate a lower route/route segment quality, and a higher route/route segment score may indicate a higher route/route segment quality. The processor 302 may further adjust the score based on the vehicle, for example. As an example, in the above scenario, if the vehicle is a motorcycle, the route/route segment score may be lowered to 1. Other examples of sensors include, but are not limited to, accelerometers, inclinometers, gyroscopes, remote sensing devices such as radar/sonar devices, suspension sensors, other sensors on the vehicle bus, etc. In some examples, the threshold may be adjusted in addition to or as an alternative to adjusting the route/route segment score based on the vehicle. For example, instead of or in addition to lowering the route/route segment score in the above scenario, where the vehicle is a motorcycle, the threshold may be raised (e.g., from 5 to 7). In this way, route/route segment scores that are generated may be stored and used for any vehicle, with the threshold for that vehicle being adjusted instead of the route/route segment scores. In such an example, route/route segment scores may only change if a condition of the route/route segment changes.

Position and motion sensors such as accelerometers, gyroscopes, and inclinometers mounted on the vehicle and coupled to a vehicle suspension, for example, may give an indication of the quality of route/route segment, which may be saved for future reference in the memory/storage device 310 of the navigation system 300. As such, when the vehicle travels on a route/route segment, the sensors may send their input to the processor 302 wherein the route/route segment score/quality generator 312 may generate a route/route segment score for that specific route/route segment. This route/route segment score may be saved in the memory/storage device 310. This route/route segment score may further be looked up or accessed whenever the route/route segment is selected for future travel based on one or more of a user input 306, and a navigational input 308. Additionally or alternatively, the route/route segment score may be uploaded to a remote server or cloud server 314. In this way, users (e.g., drivers of vehicles) may benefit from the route/route segment score determination of other vehicles/drivers. For example, a route/route segment score for a route/route segment may be determined by a processor based on route/route segment scores assigned to that route/route segment by one or more other processors (e.g., one or more processors in other vehicles).

The cloud server 314 may be an example of the network 260 of FIG. 2. The route/route segment score may be uploaded to the cloud server 314 wirelessly and/or via Bluetooth. As such, the navigation system 300 may further include a wireless transceiver (not shown) capable receiving and transmitting signals between the navigation system 300 and the cloud server 314. The transceiver may include a transmitter and a receiver and is generally capable of transmitting and receiving signals, for example. The navigation system 300 may receive the route/route segment score stored in the cloud server 314 whenever a wireless (e.g., Bluetooth) connection exists, thereby connecting the cloud server 314 to the navigation system 300. When the route/route segment score is stored in the cloud server 314, the route/route segment score may be accessed by other vehicles that may be equipped with navigation systems similar to the navigation system 300 described here. In this way, a database of route/route segment scores may be stored in the cloud server 314, and made available to many riders/drivers, and thus allow machine-to-machine advisory of route/route segment conditions. In other examples, machine-to-machine communication may occur directly from one vehicle to another in a peer-to-peer manner via a vehicle-to-vehicle network (e.g., without accessing a cloud server).

The processor 302 may receive and/or process the user input 306. As such, the user input may include one or more of a route/route segment score, route/route segment preference, route/route segment avoidance, route/route segment score threshold, and health condition. Based on the user input 306, the processor may adjust the route/route segment score generated from the sensor input 304, for example. A route/route segment with lower than threshold number potholes with a route/route segment score of 5, for example, as determined based on the sensor input (such as images captured by a camera) may be further adjusted based on the user input. For example, a user with a back pain/problems may not wish to travel though a route/route segment with potholes. Any high vibration or higher amounts of jostling that may occur when travelling along route/route segments with potholes, may induce further damage/pain in the back. Based on the health condition as entered by the user, the processor 302 may lower the route/route segment score from 5 to 2, for example due to the user input and the number of potholes. In some examples, after driving the vehicle on a route/route segment, the user may decide he/she does not like the quality of the route/route segment, and may prefer to avoid it in future. The user may input a preference to avoid that particular route/route segment, and the processor 302 may store the user preference in memory 310 which may then be retrieved at a later time and used to adjust the route/route segment score and/or the route/route segment score threshold, and/or to disqualify the route/route segment from a list of candidate route/route segments. In additional or alternative examples, the user may input a low route/route segment score indicating his/her preference to avoid the route/route segment. In some examples, the user may desire to travel through a route/route segment, even if the route/route segment has a low route/route segment score. The user may then have the option to overwrite the route/route segment score as stored in memory (e.g., user preferences memory). The processor may generate the route/route segment score based on one or more of an absolute scale, a relative scale, a sliding scale, and a graded scale. In one non-limiting example, a route/route segment score may be generated based on a type, frequency, and/or amplitude of irregularities/events in the route/route segment. For example, a route/route segment including potholes may be given a score (out of 10) selected from the range of 2-5 based on the number (e.g., frequency) of potholes and/or the amplitude (e.g., intensity, amount of deviation from a smooth route/route segment, height/depth of the pothole, size of the pothole, etc.) of the potholes. As another example, a route/route segment including a gravel surface may be given a score (out of 10) selected from the range of 3-6 based on the number (e.g., frequency) of gravel sections of the route/route segment and/or the amplitude (e.g., deviation from a smooth route/route segment, size of gravel, etc.) of the gravel. In some examples, each event/irregularity may be scored (e.g., a score identifying the severity of each irregularity) and an average or other statistical factor of the scores of irregularities in a defined route segment may be calculated and used to derive a score for that route segment.

Further to the adjustments of the route/route segment score based on the user input 306, the processor 302 may also perform additional adjustments to the route/route segment score based on navigation input 308. Navigation input 308 may include a route request (e.g., a destination, a starting point, a direction of travel, a search for a point of interest, etc.) from a user. Based on the navigation input 308, the processor may generate a route including a plurality of candidate route segments. For example, the candidate route segments may include potential route segments that may be traversed to travel from a current location and/or an entered starting location to a destination (e.g., entered by the user and/or predicted by the navigation system). The processor 302, may then determine a route score of a given route based on the individual route segment scores of each of the candidate route segments making up that route. In some examples, the route/route segments may be displayed on the display 316 (e.g., including a touchscreen, monitor, etc.). In some examples, the navigation input may include notification from off-board database of recent events. For example, if a natural emergency/disaster has occurred along the route/route segment (e.g., heat-related road buckling, flash flood, downed tree, washout, etc.), then the navigation input may include the real-time road/environment condition information, and the processor may generate a lower route/route segment score and indicate that the route/route segment may be presently avoided. The natural emergency/disaster condition may be determined based on information from an off-board database, such as a governmental agency's database of recent events, sensed data from a third-party, and/or sensed data from the vehicle. As other examples, the navigation data may include satellite images of the route/route segment, and the processor may determine if the route/route segment is paved or unpaved or a dirt route/route segment based on the satellite images. The processor may generate a lower route/route segment score if the route/route segment is unpaved or a dirt route/route segment. Some more example of navigation input may include meteorological data. For example, the navigation input may include details about weather conditions. For example, if it is raining, and the route/route segment is a dirt route/route segment, the processor may generate a lower route/route segment score for the route/route segment. Furthermore, the processor may alert the user via audio/visual alert to avoid such dirt route/route segments, especially if the vehicle is a motorcycle and/or the user has indicated a presence of health problems that are exacerbated by rough route/route segments.

Figure 4:
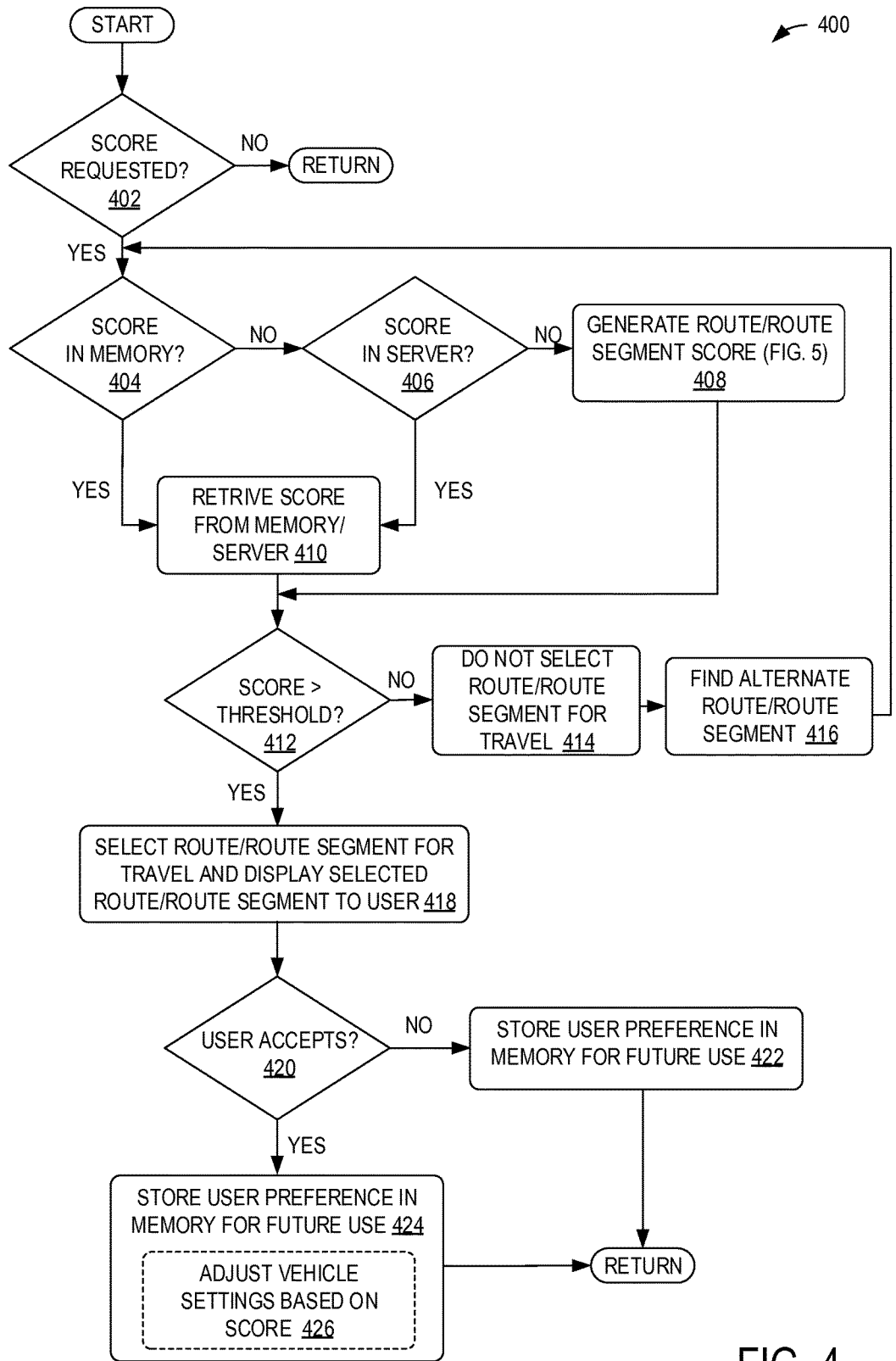
FIG. 4 shows a flow chart of an example method for selecting a route for travel based on the route score of the selected route in accordance with one or more embodiments of the present disclosure.

FIG. 4 shows a method 400 for method for selecting a route/route segment for travel based on the route/route segment score of the route/route segment. For example, method 400 may be performed by the navigation system 300 illustrated in FIG. 3. At 402 the processor (e.g., processor 302 of FIG. 3) may determine if a route/route segment score is requested. For example, the user may desire to acquire a route/route segment score before embarking on or travelling along a route/route segment, and hence may request for a route/route segment score. If there is no request for a route/route segment score when checked at 402, then method returns. However, if a route/route segment score is requested, then method proceeds to 404 where the processor determines if the route/route segment score is already in memory. As explained earlier, route/route segment scores of route/route segments travelled may be generated based on various inputs (sensor input, user input, navigation input, for example) and stored in memory. If the route/route segment score is already stored in memory/storage device of the navigation system, then method proceeds to 410 where the processor may retrieve the route/route segment score from the memory/storage device (such as memory/storage device 310 of navigation system 300 of FIG. 3, for example). However, if the route/route segment score is not located in memory when checked at 404, then method proceeds to 406, where it may be determined if the route/route segment score exists in a remote/cloud server (such as cloud server 314 of FIG. 3). As explained above, the route/route segment scores generated by one or more vehicles may be uploaded to the remote/cloud server. The route/route segment scores in the remote/cloud server may then be accessed by the navigation system. As such, the remote/cloud server may include a database of route/route segments and their respective route/route segment scores. If the route/route segment score already exists in the remote/cloud server when checked at 406, then the method proceeds to 410, where the processor retrieves the route/route segment score from the remote/cloud server. As such, the route/route segment score may be retrieved via wireless and/or Bluetooth connection. However, if the route/route segment score does not exist in the remote/cloud server, then method proceeds to 408, where the route/route segment score is generated by performing a method such as method 500, described in FIG. 5.

Figure 5:
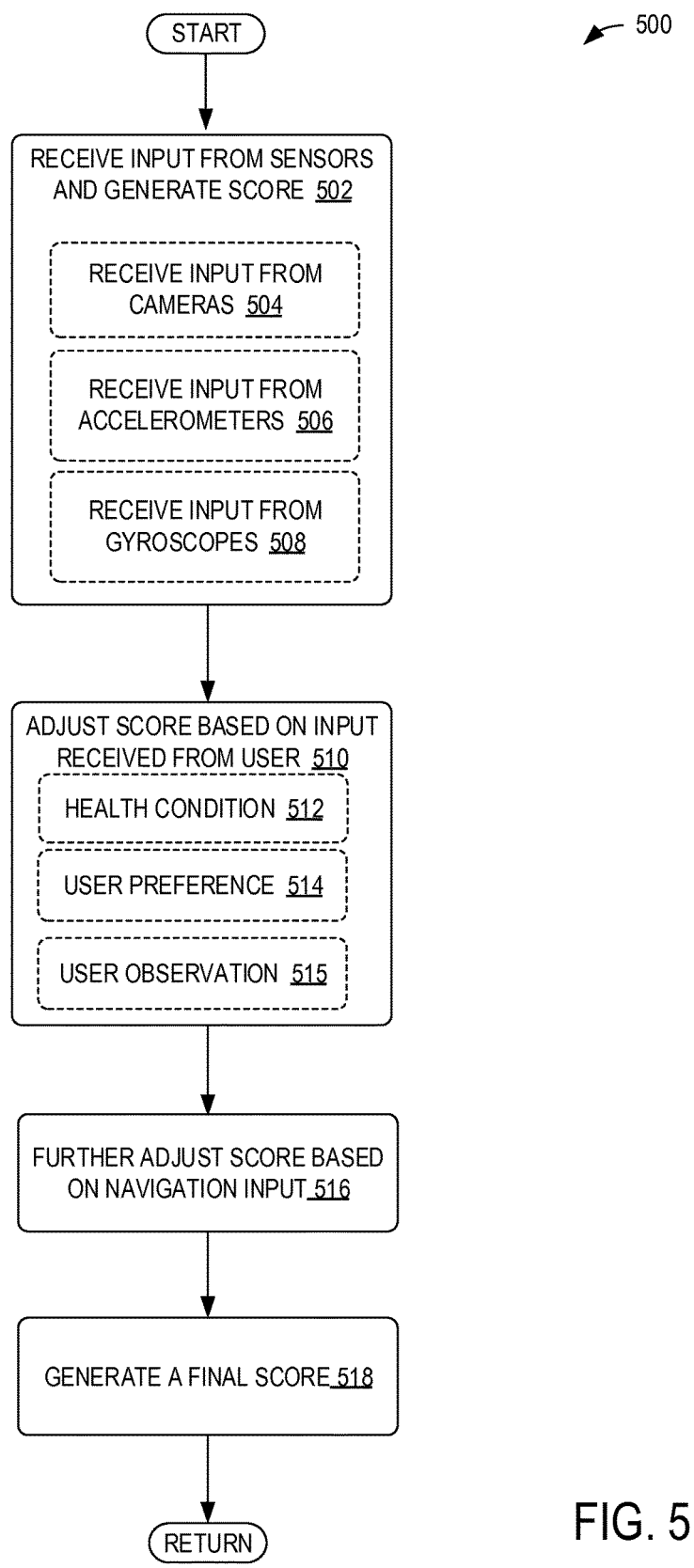
FIG. 5 shows a flow chart of an example method for generating a route segment score based on one or more of input received from sensors and/or a user in accordance with one or more embodiments of the present disclosure.

Turning now to FIG. 5, the figure shows an example method 500 for generating a route/route segment score based on one or more of input received from sensors and a user. For example, method 500 may be performed by the processor 302 illustrated in FIG. 3. At 502, the processor receives input from plurality of sensors and generates a route/route segment score based on the received sensor input. The sensor input may include one or more inputs from cameras at 504, accelerometers at 506 and gyroscopes 508. As described above, the images from the camera may be used to determine a route/route segment score. As an example, if the image of the route segment as taken by a front facing camera shows several potholes along the route segment, then the processor may generate a lower route/route segment score than an image that does not reveal any potholes (or reveals fewer potholes). Alternatively, a satellite image of the route/route segment may be retrieved from the GPS and/or a navigational database, for example, and the route/route segment score may be generated based on the analysis of the image. In addition, the processor may receive input from accelerometers and gyroscopes mounted on and/or integrated within the vehicle at 506 and 508. The inputs received from gyroscopes and accelerometers mounted on and/or integrated within the vehicle may be further adjusted based on a vehicle suspension condition, for example. Accordingly, the inputs received at 506 and 508 may be further adjusted based on the condition of the vehicle, including condition of the tires, brakes, suspension, etc.

Based on the sensor inputs received at 504, 506 and 508 (e.g., as selectively adjusted), the processor generates a route/route segment score for the route/route segment at 502. The method then proceeds to 510, where the processor may further adjust the route/route segment score generated at 502 based on input received from the user. User input may include one or more of a health condition input received at 512, a user preference received at 514, and a user observation received at 515. For example, the health condition input may be based on the driver and/or any other occupant of the vehicle, and may be input to the processor (e.g., to an in-vehicle computing system of the vehicle) prior to generating the route/route segment score, during generation of the route/route segment score (e.g., based on a displayed or audible prompt presented by the in-vehicle system to the user to request an input of health conditions of vehicle occupants), and/or after generation of the route/route segment score (e.g., to further tweak the route determination while traveling along the route). The health condition may be indicated in terms of tolerance of road irregularities (e.g., a user may indicate which types of road irregularities, such as potholes, road type [gravel, dirt, asphalt, etc.], debris, etc., aggravate the user's health condition and/or an extent to which each type of road irregularity aggravates the user's health condition [e.g., on a scale or other ranking system]). Additionally or alternatively, the health condition may be indicated by inputting the health condition itself, and the way in which road irregularities affect the health condition may be determined by the processor (e.g., based on information in a health-related database). In another example, a user may indicate a health condition by selecting a minimum tolerated route score, such that any routes or route segments having a route score below the minimum tolerated route score are not selected for travel.

The user preference 514 may include user input regarding a preference for or to avoid certain types of route/route segments (e.g., types of route/route segment surface, curvature of the route/route segment, number of lanes in the route/route segment, location of the route/route segment [e.g., city, rural, etc.], etc.), a preference to avoid or select route/route segments with certain types or amounts of irregularities or other features (e.g., potholes, debris, rough pavement, traffic lights/stop signs, railroad crossings, etc.), and/or any other suitable preference. User preference 514 may also be based on a combination of features and/or conditions. For example, the user may prefer to avoid dirt route/route segments when drought conditions are present (e.g., resulting in a "wash-board" effect on the dirt route/route segment), when flood conditions are present (e.g., resulting in slippery/muddy conditions), and/or when the route/route segment has not been graded within a threshold period of time, but the user may find dirt route/route segment travel acceptable under other conditions. Similarly, route/route segment preferences may be based on a time of day (e.g., preferring to avoid city routes during rush hour, or avoiding rural route/route segments after sunset), a traffic condition, a past, current, or predicted future weather condition, and/or other variable conditions.

User observation 515 may be based on user input from a user in the vehicle that includes the processor performing the method 500 and/or based on information originating from users of other vehicles. For example, user observation 515 may include an input of a feature of a route/route segment (e.g., a number of potholes, a location of debris in a route/route segment, and/or any of the above-described road types and features) made by one or more users (e.g., in one or more vehicles). User observations from users outside of the vehicle in which the method is being performed (e.g., "other users") may be transmitted to the vehicle in which the method is being performed via a central storage device and/or directly from devices (e.g., in-vehicle computing systems) of the other users. A user observation may include an observed condition of the route/route segment, which may provide additional/separate information regarding a dynamic condition of the route/route segment, other than the type of route/route segment (e.g., size, number of lanes, curvature, highway/city route/route segment, route/route segment surface [e.g., gravel, asphalt, dirt, etc.], etc.). For example, a dynamic condition of the route/route segment may include a number of potholes in the route/route segment, debris in the route/route segment, surface irregularities in the route/route segment, etc.

Each road that may be travelled upon by a vehicle may be segmented into road segments or route segments. In some examples, the segmentation may be based on the irregularities in the road. For example, each route segment may be defined by the number of irregularities in that segment. In some examples, a route segment may correspond to a portion of a road having an irregularity, and the route segment may have a length that is based on the separation between irregularities in the road (e.g., extending from a midway point between a first and a second irregularity to a midway point between the second and a third irregularity, sized to occupy a threshold number of irregularities, etc.). It is to be understood that a route segment may be targeted to a particular lane of a road. For example, the same stretch of a 4-lane road (e.g., from mile marker 1 to mile marker 2 of the road) may have a plurality of road segments associated therewith (e.g., four road segments—one for each lane—stretching that mile of the road, or two road segments—one for each direction of travel—stretching that mile of the road). A route segment that corresponds to only one of a plurality of lanes of a road may be used to recommend that a driver move to and/or travel via a different lane (e.g., if one lane is grated in preparation for being paved, and the other is freshly paved). The condition of the lanes for use in such route segment analysis may be sensed based on vehicle suspension metrics (e.g., comparing the vertical displacement of wheels on a left versus a right side of the vehicle) and/or any of the other sensing mechanisms described herein.

Each route segment may have an entry in a database, and each entry may include an identification of the road/route segment, information regarding a road/route segment type, and information regarding a road/route segment condition other than the road/route segment type. The information in the database entry for a given route segment may also be tagged with metadata indicating a source of the information, a time at which the information was received/observed, etc. to help a user/system to qualify the reliability of the information. In some examples, tags may be associated with road irregularities instead of the route segments in which the road irregularities are positioned. In such examples, the tags may be tied to a location on a road/route/route segment (e.g., a relative location on a road, such as a mile marker of the road) and/or to a global location (e.g., based on a coordinate system). The irregularities of a given road/route segment may be recorded by a vehicle as each irregularity is encountered and tagged with location information provided by the vehicle and/or a related navigation system. The tagged irregularity data may be stored in a cloud system remote from the vehicle and may be filterable based on parameters of the data. For example, a filter may be created at the cloud to sort the data based on location, irregularity features (e.g., frequency, amplitude, type, etc.), user associated with the vehicle that measured/sensed the irregularity, etc. In this way, an analysis of a route segment may be performed based on the dynamically and/or statically (e.g., pre-) filtered irregularity data stored in the cloud service.

Based on the health condition input, user preference input, and/or the user observation input, the processor may readjust the route/route segment score. For example, if an example route segment is laden with gravel, and the vehicle suspension is new, and the user has no major health condition or preference, then the route/route segment score may not be adjusted substantially. However, if the user has health issues, such as back/shoulder pain, then the route/route segment score for the above example route/route segment may be readjusted to a lower value for the same route/route segment/vehicle suspension condition. As another example, the route/route segment score may generated at 502 may be increased to a higher score, if the user exhibits a particular desire to travel on the gravel route/route segment. As such, the adjustment of the route/route segment score based on the user input may result in the adjusted route/route segment score at 510 being higher or lower than the route/route segment score at 502. Next the method proceeds to 516, where the route/route segment score is further adjusted based on navigation input. For example, if the navigation input shows that a natural disaster has recently occurred on the route/route segment of interest, then the route/route segment score may be further adjusted to a lower score. Thus, at 518, a final route/route segment score may be generated corresponding to the route/route segment score as adjusted at 510 and further adjusted at 516. It is to be understood that the above-described adjustments may be optional, and the final route/route segment score may be dependent upon only one or only a subset of the inputs described above. In some examples, the one or subset of the inputs used for adjustment may be based on a default (e.g., predetermined) setting, a user-defined setting, a confidence and/or reliability score for the source of the input (e.g., based on historical data and/or user feedback from one or more users), and/or any other suitable parameter(s).

Returning to FIG. 4, the processor may generate a route/route segment score at 408 by performing method 500 if the route/route segment score does not already exist either in memory or server. The method then proceeds to 412 where it may be determined if the route/route segment score (either retrieved from memory/server or generated) is higher than a threshold. For example, the route/route segment score may be calculated automatically based on data received from vehicle sensors and/or external sensors (e.g., traffic cameras, satellite imagery, sensors from other vehicles, etc.) as a vehicle travels the route/route segment. In such examples, the sensor data and/or the calculated route/route segment score may be uploaded to a cloud computing system (e.g., cloud server and/or network of servers). In examples where the sensor data is uploaded to the cloud computing system, the cloud computing system may calculate and store the route/route segment score (e.g., upon receiving a threshold amount of data and/or by continuously updating a route/route segment score as additional data is received) without any user input. In this way, data may be automatically captured by the vehicle sensors, uploaded to the cloud computing system, and used to calculate the route/route segment score without any user intervention. In additional or alternative examples, a user may provide input to authorize the capture, upload, and/or calculation of sensor data/route/route segment scores and/or to assist in determining a route/route segment score.

The threshold may be a predetermined measure of safety and comfort of travel. As an example, on scale of 1 to 10, the threshold may be set to 6. In some examples, the threshold may be adjusted based on user input, current conditions, available data for generating/retrieving a route/route segment score, etc. Any route/route segment score above the threshold may indicate that the route/route segment is fit for travel, whereas any score below the threshold may indicate that the route/route segment is unfit/unsafe for travel. In examples where the threshold is set to represent the minimum acceptable level of quality of route/route segment for a user, a route/route segment score that is equal to the threshold may be treated as meeting the threshold (e.g., following the described "greater than the threshold" paths). In alternative examples where the threshold is set to represent an unacceptable level of quality of route/route segment for a user, a route/route segment score that is equal to the threshold may be treated as not meeting the threshold (e.g., following the described "not greater than the threshold" or "lower than the threshold" paths). If the route/route segment score is lower than threshold, then method proceeds to 414, where the route/route segment is not selected for travel, and next at 416, the processor may find a new alternate route/route segment (e.g., for inclusion in a route). The method then returns to 404, where the process of retrieving or generating route/route segment score for the new route/route segment is repeated.

However, if the route/route segment score is higher than the threshold, then method proceeds to 418 where the processor selects the route/route segment for travel and further displays the selected route/route segment to the user. Next, at 420, it is determined if the selected route or route segment is accepted by the user. If the selected route/route segment is accepted by the user, then the method proceeds to 424 where the user preference is stored in memory for future reference/use. In addition, based on the selection, a vehicle setting may be adjusted at 426 and the method returns. Adjusting the vehicle setting may include one or more of adjusting vehicle suspension, enabling/disabling cruise control options, setting a navigation unit to follow and guide the driver along the accepted route segment/route, etc. Conversely if the user rejects the selected route/route segment at 420, then method proceeds to 422, where the user preference is stored in memory for future use/retrieval and the method ends and/or returns to 404 to determine a route/route segment score for a new alternative route/route segment.

Figure 6:
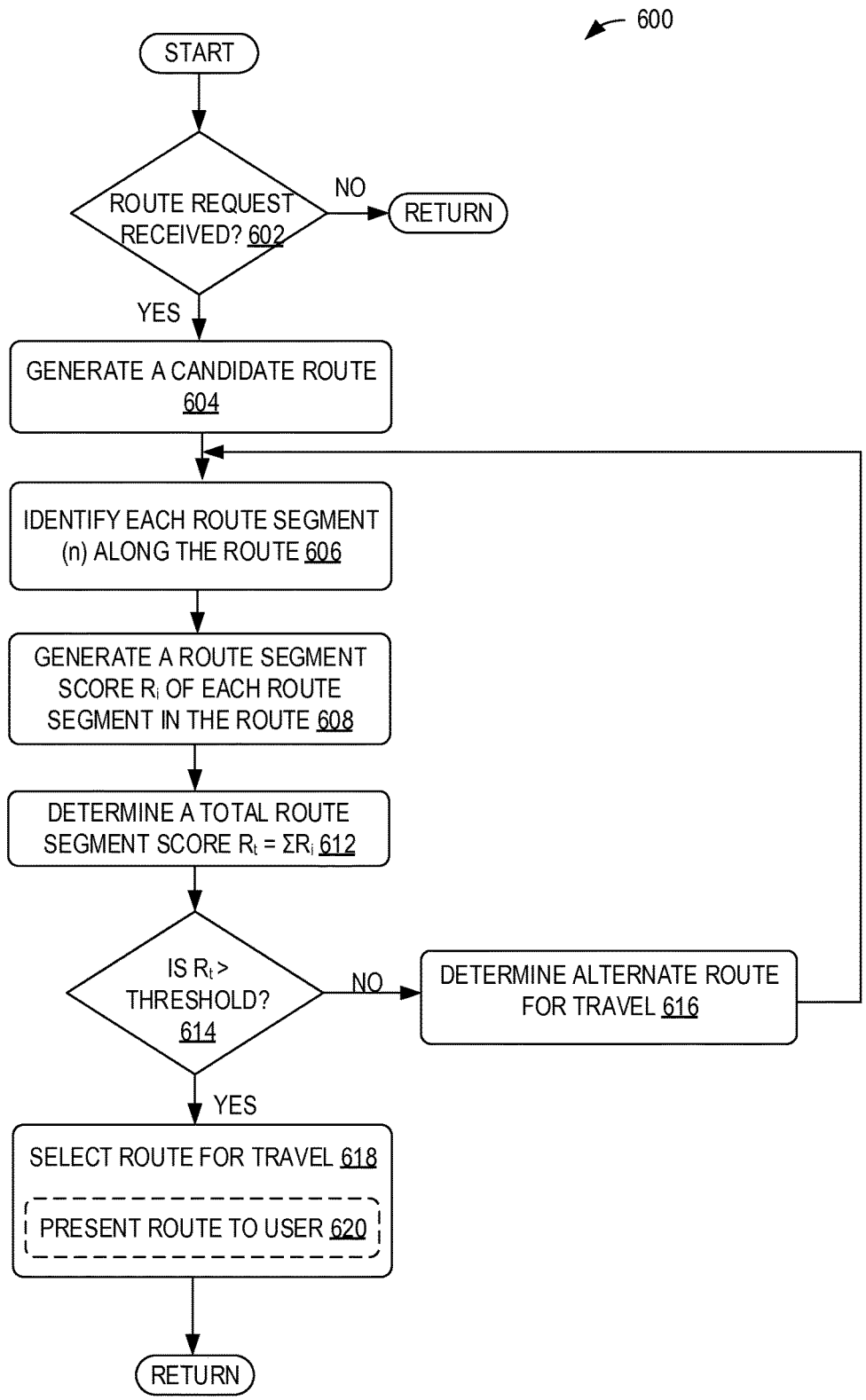
FIG. 6 shows a flow chart of an example method for generating a route for travel based on a total route segment score of the selected route in accordance with one or more embodiments of the present disclosure.

FIG. 6 shows an example method for generating a route for travel based on a total route segment score of route segments in the selected route. For example, method 600 may be performed by the navigation system 300 illustrated in FIG. 3 based on a navigation request received. At 602 it may be determined if a route request was received. The route request may be initiated when the processor receives a destination input from the user, for example. If the route request was not received, then method returns. However, if the route request was received, then method proceeds to 604, where the processor generates a candidate route. For example, the candidate route may be generated based on a current location, and the destination. The candidate route may be further generated by using inputs from the GPS, for example. Next, at 606 the method includes identifying each route segment (n) along the candidate route. As an example, the processor may identify four route segments (n=4) in the route to navigate from a current location A to a destination B. Then, the method proceeds to 608 where a route segment score is generated for each of the n identified route segments. In the above example, four route segment scores ($R_1=3$, $R_2=7$, $R_3=8$, $R_4=2$, for example) are generated for each of the four identified route segments. Next, the method proceeds to 612, where a total route segment score $R_t$ is determined. As such, the total route segment score may be the sum of all the individual route segment scores and may correspond to/define a route score for the route. In the above example, $R_t$ is equal to ($R_1+R_2+R_3+R_4$) which is 20. In other examples, the total route segment score may an average of the individual route segment scores. In still other examples, the total route segment score may be a weighted average of the individual route segment scores. As such, the weight may be determined based on the user preference, confidence/reliability in the inputs used to generate/retrieve the route segment scores, and/or any other suitable parameter(s). The weight may additionally or alternatively be configured to emphasize lower scores more heavily than higher scores (e.g., giving lower scores a larger weight than higher scores when determining the weighted average).

The method then proceeds to 614, where it is determined if the total route segment score is higher than a threshold. The threshold may be predetermined measure of safety and comfort of travel (threshold=15, for example), set by a user, and/or otherwise set and/or adjusted as described above with respect to FIG. 4. For example, the threshold may define an absolute minimum route segment score that may be selected for travel. In such examples, a user may select a preference to not travel on any routes/route segments having a route/route segment score below a selected threshold. If the total route segment score is higher than the threshold, then method proceeds to 618 where the processor selects the route for travel, and further at 620, the selected route is displayed to the user. However, if the total route segment score is lower than the threshold, then method proceeds to 616, where alternate route is determined, and then the method returns to 606 to calculate the total route segment score of the alternate route as described above. In this way, the system may warn/notify the user about unsafe routes, and offer alternate safer routes for travel, thereby reducing the chances of vehicular accidents and injuries.

In some examples, the in-vehicle computing system may output (e.g., via a display, vehicle speakers, alert to a user's smart phone, etc.) a warning if an input destination cannot be reached with the current settings (e.g., if all possible routes to a destination have a route score below the threshold and/or have one or more route segments with scores below the threshold). Such a warning may allow a user to adjust the settings (e.g., set a lower threshold), select a different destination, and/or cancel the navigation. The computing system may assist the user in adjusting the settings by indicating the highest possible route/route segment score for travelling to the destination and/or identifying the route segments that are below the threshold. In this way, a user may decide whether the route with the highest route/route segment score is acceptable and/or otherwise adjust settings to determine an acceptable route. The computing system may assist the user in selecting a different destination by determining similar destinations (e.g., based on location of/travel time to the destination, type of destination [e.g., type of point of interest—if the destination is a restaurant, identifying other similar restaurants], prior trips [e.g., if a user typically visited a coffee shop after visiting the input destination, suggesting to skip the destination and head straight for the coffee shop], and/or other parameters) and presenting one or more of the determined destinations to the user (e.g., along with a route score for each destination and/or a description of a route to each destination).

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109/200 described with reference to FIGS. 1 and 2 and/or navigation system 300 of FIG. 3. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

The systems and methods described above also provide for a driver assistance system for a vehicle, the driver assistance system comprising a sensor module communicatively coupled to one or more sensors, a user interface to receive input from a user, a processor, and a storage device storing instructions executable by the processor to determine a route for the vehicle to travel, the route including one or more route segments, and for each of the one or more route segments in the route, select that route segment from a plurality of candidate route segments if a route segment quality of that route segment is greater than a threshold, one or more of the threshold and the route segment quality being based on inputs indicating an observed condition of the route segment, the inputs being received from one or more of the user and a remote user outside of the vehicle. A second example of the driver assistance system optionally includes the first example and further includes wherein the instructions are further executable to identify that a route segment quality of a route segment on which the vehicle is travelling is lower than the threshold and present alternate route segments to the user to guide the user in a determined direction or to a determined destination. A third example of the driver assistance system optionally includes one or more of the first and the second examples and further includes wherein the navigation database is stored in one or more of the storage device, and a server. A fourth example of the driver assistance system includes one or more of the first through the third examples, and further includes wherein the sensors include one or more of accelerometers, gyroscopes, and cameras. A fifth example of the driver assistance system includes one or more of the first though the fourth examples, and further includes wherein the threshold is further adjusted based on a user preference and the system further includes a global positioning sensor (GPS).

The systems and methods described above also provide for a method for a navigation system of a vehicle, the method comprising receiving a request to determine a route of travel for the vehicle, the request including one or more of a destination and a direction of travel, determining the route for the vehicle to travel, the route including one or more route segments, and selecting the route from a plurality of candidate routes if a route score of that route is greater than a threshold, the route score being based on a quality of the one or more route segments of the route as reported by one or more of an occupant of the vehicle and a remote user outside of the vehicle, and one or more of the route score and the threshold being further based on additional input from one or more of the occupant and a sensor of the vehicle. A second example of the method optionally includes the first example, and further includes wherein the total route segment score is one or more of a sum, an average, and a weighted average of route segment scores of the route segments in the route. A third example of the method optionally includes one or more of the first and the second examples, and further includes wherein the threshold is based on the route segment score, the route segment score is based on the user input and further adjusted based on input from the plurality of sensors, the sensors including one or more of camera, accelerometer and gyroscope.

The systems and methods described above also provide for a navigation system of a vehicle, the system comprising a route segment score memory, a sensor module communicatively coupled to plurality of sensors, a user input interface configured to receive a user input, a processor, and a storage device storing instruction executable by the processor to generate a route segment score of a route segment based on the user input and input from the sensor module, the user input including an indication of an observed condition of the route segment as entered by an occupant of the vehicle or a remote user outside of the vehicle, store the route segment score in one or more of the route segment score memory and a cloud server, and determine a route for the vehicle based on the route segment score of the route segment, the route including the route segment if the route segment score is above a threshold, and the route segment score being selectively retrieved from the route segment score memory or the cloud server.

In a first example of the navigation system, the system may additionally or alternatively include a wireless transmitter that transmits the generated route segment score to the cloud server. A second example of the navigation system optionally includes the first example and further includes wherein the system further includes a wireless receiver that receives the route segment score from the cloud server. A third example of the navigation system optionally includes one or more of the first and the second examples, and further includes wherein the storage device includes further instructions executable by the processor to: responsive to a route request, the route request received via the user input interface, identify and map route segments along the route. A fourth example of the navigation system optionally includes one or more of the first through the third examples, and further includes wherein the storage device includes further instructions executable by the processor to: responsive to identifying the route segments, retrieve the route segment score for the identified route segments from any of the cloud server via the wireless receiver and the route segment score memory. A fifth example of the navigation system optionally includes one or more of the first through the fourth examples, and further includes selecting a final route based on a total route segment score being higher than a threshold, the total route segment score is based on the route segment score of each of the route segments along the route. A sixth example of the navigation system optionally includes one or more of the first through the fifth examples, and further includes wherein the total route segment score if further adjusted based on one or more of a user condition and a user avoidance preference. A seventh example of the navigation system optionally includes one or more of the first through the sixth examples, and further includes wherein the user condition and the user preference is determined based on the user input. A eighth example of the navigation system optionally includes one or more of the first through the seventh examples, and further includes wherein the storage device includes further instructions executable by the processor to adjust vehicle settings based on the total route segment score. A ninth example of the navigation system optionally includes one or more of the first through the eighth examples, and further includes wherein the vehicle settings include one or more of adjusting a suspension of the vehicle, and enabling/disabling automatic cruise control.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A driver assistance system for a vehicle, the driver assistance system comprising:
  a user interface to receive input from a user;
  a processor; and
  a storage device storing instructions executable by the processor to:
    determine a route for the vehicle to travel, the route including one or more route segments; and
    for each of the one or more route segments in the route, select that route segment from a plurality of candidate route segments if a route segment quality of that route segment is greater than a threshold, one or more of the threshold and the route segment quality being based on inputs indicating an observed condition of the route segment and a health condition of the user, the inputs being received from one or more of the user and a remote user outside of the vehicle.

2. The driver assistance system of claim 1, wherein the instructions are further executable to not select one or more candidate route segments for inclusion in the route if the route segment quality of each of the one or more candidate route segments is lower than the threshold.

3. The driver assistance system of claim 2, wherein the instructions are further executable to identify that the route segment quality of a route segment on which the vehicle is travelling is lower than the threshold and present alternate route segments to the user to guide the user in a determined direction or to a determined destination.

4. The driver assistance system of claim 1, further comprising a sensor module communicatively coupled to one or more sensors, and wherein one or more of the threshold and the route segment quality is further determined based on inputs from the sensor module and/or route segment information from a navigation database, and wherein the navigation database is stored in one or more of the storage device and a server.

5. The driver assistance system of claim 4, wherein the one or more sensors include one or more of an accelerometer, a gyroscope, and a camera.

6. The driver assistance system of claim 1, wherein the threshold is further adjusted based on a user preference, the system further comprising a global position sensor (GPS).

7. A method for a navigation system of a vehicle, the method comprising:
receiving a request from an occupant of the vehicle to determine a route of travel for the vehicle, the request including one or more of a destination and a direction of travel;
determining the route of travel for the vehicle, the route including one or more route segments; and
selecting the route from a plurality of candidate routes if a route score of that route is greater than a threshold, the route score being based on a quality of the one or more route segments of the route as reported by one or more of the occupant of the vehicle and a remote user outside of the vehicle, and one or more of the route score and the threshold being further based on additional input from one or more of the occupant and a sensor of the vehicle, the quality of the one or more route segments including one or more of a type of an irregularity, a size of the irregularity, and a frequency of occurrence of the irregularity in each of the one or more route segments, and wherein the input from the occupant further includes a tolerance to the irregularity.

8. The method of claim 7, wherein the route score of the route is based on a total route segment score of the route segments in the route, and wherein the quality of the one or more route segments is adjusted based on an ambient vehicle noise detected using a microphone.

9. The method of claim 8, wherein the total route segment score is one or more of a sum, an average, and a weighted average of route segment scores of the route segments in the route.

10. The method of claim 8, wherein the sensor includes one or more of a camera, an accelerometer, and a gyroscope.

11. A navigation system of a vehicle, the system comprising:
a route segment score memory;
a sensor module communicatively coupled to a plurality of sensors;
a user input interface configured to receive a user input;
a processor; and
a storage device storing instructions executable by the processor to:
generate a route segment score of a route segment based on the user input and input from the sensor module, the user input including one or more of an indication of an observed condition of the route segment and a health condition as entered by an occupant of the vehicle or a remote user outside of the vehicle;
store the route segment score in one or more of the route segment score memory and a cloud server; and
determine a route for the vehicle based on the route segment score of the route segment, the route including the route segment if the route segment score is above a threshold, and the route segment score being selectively retrieved from the route segment score memory or the cloud server.

12. The navigation system of claim 11, wherein the system further includes a wireless transmitter that transmits the generated route segment score to the cloud server.

13. The navigation system of claim 12, wherein the system further includes a wireless receiver that receives the route segment score from the cloud server.

14. The navigation system of claim 13, wherein the storage device includes further instructions executable by the processor to: responsive to a route request, the route request received via the user input interface, identify and map route segments along the route, and wherein the user input includes each of the indication of the observed condition of the route segment and the health condition.

15. The navigation system of claim 14, wherein the storage device includes further instructions executable by the processor to: responsive to identifying the route segments, retrieve the route segment score for the identified route segments from any of the cloud server via the wireless receiver and the route segment score memory.

16. The navigation system of claim 15, wherein the storage device includes further instructions executable by the processor to select a final route based on a total route segment score being higher than a threshold, the total route segment score based on the route segment score of each of the route segments along the route.

17. The navigation system of claim 16, wherein the total route segment score is further adjusted based on one or more of a user condition and a user avoidance preference.

18. The navigation system of claim 17, wherein the user condition and the user avoidance preference are determined based on the user input.

19. The navigation system of claim 16, wherein the storage device includes further instructions executable by the processor to adjust vehicle settings based on the total route segment score.

20. The navigation system of claim 19, wherein the vehicle settings include one or more of adjusting a suspension of the vehicle, and enabling/disabling automatic cruise control.

\* \* \* \* \*